(No Model.)

M. A. HARDY.
MAGNETO ELECTRIC MACHINE.

No. 253,699. Patented Feb. 14, 1882.

WITNESSES
T. J. Keane
Jas. R. Bowen

INVENTOR
Marcus A. Hardy
By his atty.
Edwin H. Brown

UNITED STATES PATENT OFFICE.

MARCUS A. HARDY, OF NEWPORT, RHODE ISLAND.

MAGNETO-ELECTRIC MACHINE.

SPECIFICATION forming part of Letters Patent No. 253,699, dated February 14, 1882.

Application filed August 15, 1881. (No model.)

*To all whom it may concern:*

Be it known that I, MARCUS A. HARDY, of Newport, in the county of Newport and State of Rhode Island, have invented certain new and useful Improvements in Magneto-Electric Machines, of which the following is a specification.

The improvements relate to machines which provide for storing up power with a slow and easy movement, and at a desired time letting the power operate to produce a rapid motion of the armature of a magneto-electric machine, so as to effect the production of a powerful electric current. This enables very powerful electric currents to be generated in a magneto-electric machine which is operated by hand. Such machines are useful for firing a series of fuses in mining or blasting operations, for lighting a series of gas-lights, and for other analogous purposes.

The improvements consist in the combination, with a magneto-electric machine and a convolute spring for rotating the armature thereof, of a novel arrangement of mechanism, hereinafter particularly described and claimed, through which said spring may be wound up, and after being wound up may, when released, operate the armature of said machine, whereby I produce a very simple, compact, and desirable machine.

They also consist in the combination, with a magneto-electric machine having electro field magnet or magnets, means for driving the machine, and mechanism adapted to store up power in the means for driving the machine, of a brake for controlling the means for driving the machine, and a switch, preferably actuated by said brake, whereby the electric current generated in the machine may at first be caused to magnetize the field-magnets of the machine, and after this is accomplished may be caused to direct the electric current upon an outside circuit to attain any desired result.

Figure 2:
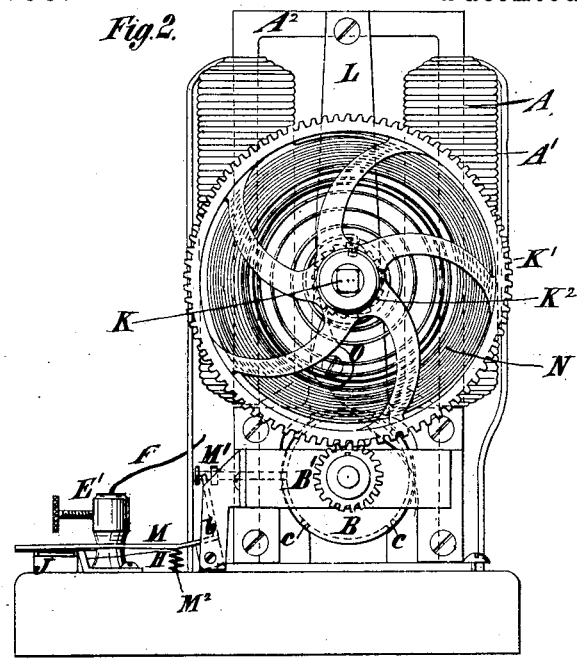
Figure 1:
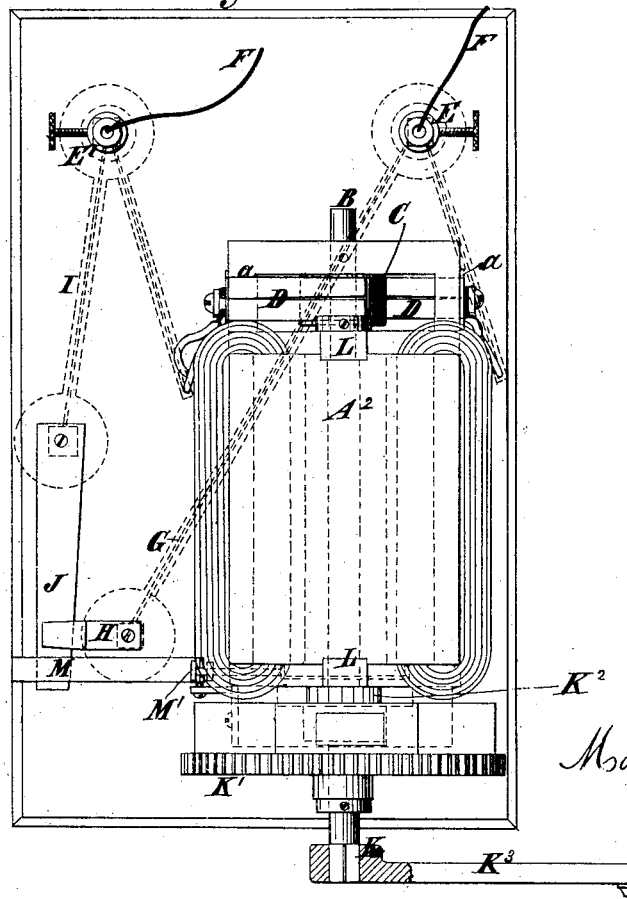

In the accompanying drawings, Figure 1 is a plan or top view of a magneto-electric machine embodying my improvements, and Fig. 2 is an end view of the same with certain parts shown in section.

Similar letters of reference designate corresponding parts in both figures.

A A' A$^2$ designate the field-magnets of the machine. As here shown, they are electro-magnets consisting of upright slightly-magnetic iron cores wound with insulated wire A' and connected at the top by a cross-piece, A$^2$. Their poles, of reverse kind, are located at the lower ends of the cores, and on their opposite sides are arc-shaped.

B designates an armature, consisting of an iron core wound lengthwise with insulated wire, and mounted in suitable bearings to enable it to rotate between the poles of the cores of the field-magnets.

C designates a commutator mounted on one of the journals of the armature, and operating in conjunction with brushes D, which are insulated from their supports at $a$, and are connected to the wires of the field-magnets. The wires of the field-magnets are also connected to binding-posts E E', from which extend the ends of the wire F, which forms the outside circuit, leading to the work which is to be done by the machine. From the bottom of the binding-post E a wire, G, leads to a metal arm, H, and from the binding-post E' a wire, I, leads to a metallic spring-arm, J, which, when not otherwise actuated, makes contact with the arm H. These arms H J constitute a circuit-closer. When these two arms are in contact a short-circuit or machine-circuit is completed, including the wire of the field-magnets; but when the arm J is depressed so as to break its contact with the arm H the current generated by the machine passes from the binding-posts E E' over the outside or work circuit.

K designates a shaft mounted in standards L between the field-magnets, above the armature B, and carrying a large driving-wheel, K', which gears with a small gear-wheel or pinion, B', which is affixed to one of the journals of the armature B, and is in the same plane as the driving-wheel K'. The wheel K' is loosely mounted on the shaft K, and is prevented from rotating, save at the desired time, by means of a brake of suitable form. The brake here shown consists of a lever, M, fulcrumed to a standard, $b$, and acting upon a pin, M', so as to effect the engagement of the pin with one of a number of recesses, $c$, in the periphery of the adjacent head or end piece of the armature B, or its disengagement therefrom. A spring, M$^2$, acting on the under side of the lower arm of the lever M, actuates it so as to effect the engagement of the pin M' with one of the recesses in the armature when one comes opposite the pin. The lower arm of the lever M extends over the spring-arm J, and hence when depressed it first actuates the brake-pin M' so as to release the armature and wheel K', and then shifts the spring-arm out of contact with the arm H.

N designates a stout convolute spring, which is attached at one end to the shaft K and at the other end to the inside of the driving-wheel K'. A ratchet-wheel, $K^2$, is rigidly affixed to the shaft K, and a pawl, O, pivoted to the adjacent standard L, engages therewith under an impulse from a spring which is combined with it. By means of the pawl and ratchet-wheel the shaft K is prevented from moving, except in the proper direction to wind up the spring N. A crank, $K^3$, on the shaft K serves as a means whereby it may be rotated.

To operate the machine the brake is made to engage with the armature B and hold it and the wheel K' stationary. Then the shaft K is rotated to wind up the spring N. When the spring is wound up the outer arm of the brake-lever M is depressed to disengage the pin M' from the armature B and allow the spring N to rotate the armature rapidly. As the lever M effects the release of the brake before it operates on the spring-arm J, the entire electric current generated is at first sent through the wire of the field-magnets and powerfully magnetizes these magnets, and then is sent on the outside or work circuit. It will be obvious that the wheels K' and B' and the spring N constitute means for driving the armature B, and that the shaft K and crank $K^3$ form a mechanism for storing up power in the means for driving the armature.

Where the switch for passing the current first through the field-magnets and then through the outside circuit is employed, a weight or other means for driving the armature might be used in place of the spring.

It will be seen that by arranging the mechanism through which the spring actuates the armature as here represented I produce a very simple machine, and one which is very compact and portable.

What I claim as my invention, and desire to secure by Letters Patent, is—

1. The combination of the field-magnets A A', armature B, gear-wheel or pinion B', shaft K, gear-wheel K', spring N, ratchet-wheel $K^2$, pawl O, and a brake for controlling the wheel K', substantially as specified.

2. The combination, with a magneto-electric machine having an electro-field magnet or magnets, means for driving the machine, and mechanism for storing up power in the means for driving the machine, of a brake for controlling the means for driving the machine, and a switch actuated by said brake, whereby the electric current generated in the machine may at first be caused to magnetize the field-magnets of the machine, and after that is accomplished to direct or shift the electric current upon an outside circuit, substantially as specified.

3. The combination, with a magneto-electric machine having electro field magnet or magnets, means for driving the same, and mechanism for storing up power in the means for driving the machine, of a brake for controlling the means for driving the machine, comprising a lever, M, and the binding-posts E E', connected with the wire of the field-magnets, the wires G I, and the arms H J, substantially as specified.

MARCUS A. HARDY.

Witnesses:
JOHN G. COSTELLO,
DARIUS BAKER.